June 28, 1966 W. DUBILIER 3,258,666

CAPACITOR AND METHOD OF ADJUSTING THE SAME

Filed June 3, 1964

United States Patent Office 3,258,666
Patented June 28, 1966

3,258,666
CAPACITOR AND METHOD OF ADJUSTING
THE SAME
William Dubilier, New Rochelle, N.Y., assignor to Cornell-Dubilier Electric Corporation, a corporation of Delaware
Filed June 3, 1964, Ser. No. 372,194
15 Claims. (Cl. 317—260)

The present invention relates to electrical capacitors and is particularly concerned with capaictors having convolutely wound electrodes and dielectric strips.

One form of well-known and widely used capacitor to which the invention is applicable involves a pair of conductive-strip electrodes separated from each other by dielectric strips, the electrodes and the dielectric material being convolutely wound to form a capacitor section. Such capacitor sections are usually placed in a protective can and impregnated with an insulating liquid. Their electrical terminals are sealed through the can to provide connection to the wound electrodes. The invention is also applicable to capacitors of other construction such as capaictors having stacked dielectric and electrode layers. In both the wound and stacked types, the capacity is affected by increase or decrease of pressure which affects thickness of the dielectric layers and the separation between the electrodes.

In the manufacture of capacitors there is a long-standing problem of producing capacitors of known size. As a normal procedure the number of layers of dielectric and electrodes (whether wound or stacked) are counted, and the assembly is considered complete when a standard number of layers is reached. Alternatively, the capacitance of the dry assembly is measured continuously during the assembly process, and assembly is terminated when a standard value of "dry" capacitance is reached. Regardless of how the capacitor section is made, by the time it has been assembled into its enclosing can and impregnated, the capacitance has changed. This change is not consistent from one unit to the next so that usually the variation represents a large percentage above and below the size of capacitor that is desired.

In many circuit applications such a latitude of capacitance variation is not tolerable. In such applications a stated value of capacitance is specified with a very much lower tolerance which could be 1%. In the manufacture of such capacitors there may be large rejections as it is extremely difficult to make finished units when close tolerance limits are required. Such capacitors sell at a large premium, demonstrating the difficulty of producing precisely controlled units. One way of meeting requirements for capacitors with close tolerances is by selecting capacitors of the specified value out of large production runs of standard, wide-tolerance units. This approach to the problem yields only limited numbers of units, whereas recent developments require capacitors of close tolerance in ever-increasing numbers.

An object of the present invention resides in providing a new form of capacitor construction that affords precise control of the capacitance of the finished capacitor having a capacitor section mounted and sealed in a container. Correspondingly an object of the invention resides in providing a novel method of adjusting capacitors to achieve specified values of capacitance within narrow tolerance limits and where the adjustment remains permanent for practical purposes.

In one method of carrying out the present invention, an inflatable tubing or device is assembled to a wound capacitor section, the whole being contained in a can or equivalent enclosure. The can and the capacitor section are impregnated and sealed airtight and moisture proof, so that the capacitor is essentially in its finished condition. The inflatable device which is open becomes filled with the same compound or insulating liquid as the impregnant of the capacitor unit. The inflatable device could also be filled later. A rubberlike material is used as a closure to tightly fill or cover the open end of the tubing or inflatable device. A tubular needle is then inserted or forced through the closure, and more liquid is forced into the tubing or liquid is extracted, which increases or decreases the pressure on the capacitor section and thus increases or decreases the capacity of the unit. Small or large amounts of fluid extracted or injected are effective to vary the pressure applied by the inflatable device to the capacitor section, which thus varies the pressure and the resulting capacity in minute amounts, as desired.

Ordinarily the value of capacitance of the impregnated section is deliberately made somewhat lower than that which is desired, and as the pressure in the inflatable member increases, the capacitance of the capacitor section increases. While this is a direct and effective capacitance-adjusting procedure and is presently preferred, it is possible in concept to utilize the same capacitor construction in a manner that enables the capacitance to be adjusted downward. This could be achieved by initially charging the inflatable member with a certain amount of fluid before the assembly of the inflatable member and the capacitor section in its can is filled with impregnating fluid and sealed, as noted above. Thereafter, by extracting some of the fluid from the inflatable member it becomes possible to reduce the capacitance of the finished capacitor. This enables downward adjustment of capacitance to meet specifications; and the same inflatable member which is initially charged with a certain amount of fluid can also be used to adjust the capacitance upward if that should prove necessary.

The nature of the invention and its further objects and aspects of novelty will be better appreciated from the following detailed description of several embodiments which are shown in the accompanying drawings. In the drawings.

Figure 1:
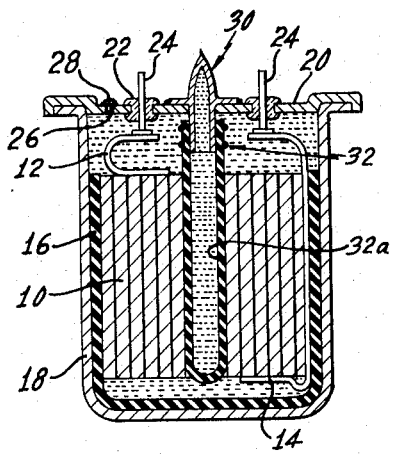
FIG. 1 is an enlarged longitudinal cross section of a capacitor embodying certain features of the present invention incorporating an inflatable member.

Referring now to FIG. 1 of the drawings, a cylindrical capacitor section 10 is shown, being a convolutely wound assembly of alternate layers of dielectric material and electrode strips, there being at least two electrodes in the wound capacitor. (More than two electrodes are present in wound capacitors having multiple sections, as well as in wound capacitors having series capacitor sections.) One terminal strip 12 is connected to one of the electrodes of the wound section 10, and another terminal strip 14 is connected to the other electrode in FIG. 1. A sleeve or cup of insulation 16 encircles section 10 and terminal lead 14, and protects the bottom of the capacitor section. A cylindrical can 18 fits snugly about capacitor section 10 and sleeve or cup 16. Cover 20 is soldered or welded to can 18, and terminals 24 extend through sealed insulating bushings 22 in the cover.

Capacitor section 10 and its enclosing can and cover are subjected to hard vacuum for a prolonged interval, for removing air and water vapor, the gas and vapor emerging by way of an opening 26 in the cover. Thereafter impregnating liquid such as stablized oil or a manufactured insulating liquid is admitted through this opening, impregnating capacitor section 10 and filling the space in can 18 not occupied by capacitor section 10. The enclosure is sealed conveniently by applying molten metal or other seal material to the opening 26 to form a closure 28.

So much of the capacitor as thus far described and which is included in FIG. 1 is a typical wound capacitor of relatively small size. In its finished condition its capacitance may be any value within a relatively wide range. Where special precautions are taken to measure the value of the dry capacitance winding as it is being wound, the capacitance can be held to a closer figure. Subsequent processing of accurately controlled dry units into finished capacitors leads to capacitance variations which would be completely unacceptable where close tolerances are required.

Additional to the conventional parts of the capacitor described above, the capacitor of FIG. 1 includes a metal tube 30 and an inflatable tube 32. Metal tube 30 is hermetically sealed to cover 20 and includes an inward-extending portion 30b and an outward-extending portion 30a (see also FIG. 1A). Inflatable tube 32 is of any material that can be expanded by internal pressure and is chemically inert in relation to the filling liquid, and it is impervious to the liquid. The lower end of tube 32 is sealed, and its open upper end is sealed and mechanically secured to tube portion 30b as with adhesive on tube 30b and a wire 34 tightly wound around tube 32, or by any other suitable means.

In one method of manufacture, the capacitor is assembled in readiness for impregnation, and at that time the top of metal tube 30 is open and exposed. During impregnation of section 10 and filling of container 18, 20, the liquid will also fill tubes 30 and 32. A closure 36 as of rubber-like material is then forced on the end of tube portion 30a which is shaped as in FIG. 1A at this phase of the manufacture.

A tubular needle 38 is then driven through closure 36, and more of the same liquid is forced into tubes 30 and 32 while the capacity at terminals 24 is being measured. Additional liquid when injected develops uniform pressure along the winding-mandrel passage of capacitor section 10, and this increases the capacitance. When the exact desired value is reached, tube portion 30a in FIG. 1A is sealed, as with a pinch seal and solder or in any other convenient manner.

In a modified procedure, closure 36 can be applied and tube 32 can be filled with fluid under pressure before container 18, 20 and capacitor section 10 are impregnated. Thereafter, after section 10 has been impregnated, the liquid pressure inside tube 32 can be adjustably decreased. This is conveniently done using a tubular needle and a piston in reverse, withdrawing some of the liquid. Tube 30a is sealed off when the desired value of capacitance is reached.

In the foregoing methods the capacitance is adjusted at the final stage of manufacture, and for this reason, the adjustment takes into account all of the manufacturing variables that affect the capacitance of any given unit. Consequently a high order of precision in the resulting capacitance can be realized by such adjustment. The desired capacitance can readily be obtained within a fraction of 1%. The pressure applied to the capacitor section by device 32 is distributed uniformly. Inasmuch as the same liquid is used both inside and outside of device 32, the expansion and contraction of the liquid due to temperature changes will have little if any effect on the adjusted value of the capacitance. The added structure and adjusting procedure are simple yet highly effective, and add but little to the cost of the capacitor. The described construction thus makes available capacitors of great accuracy at moderate manufacturing expense.

Figure 2:
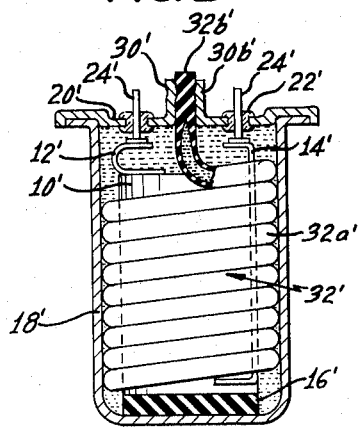
FIG. 2 is a modification of the embodiment in FIG. 1.
Figure 1A:
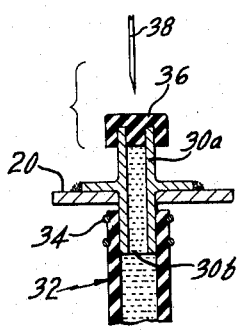
FIG. 1A is a fragmentary view of a detail of FIG. 1 during the manufacture thereof.

The construction, procedure for impregnation and container-filling, and the adjusting procedure as described in connection with FIGS. 1 and 1A are naturally susceptible of a latitude of variation within the broader aspects of the invention. A modification of particular merit is illustrated in FIG. 2 wherein parts corresponding to those in FIG. 1 bear primed numerals. Cup 16 of insulation in FIG. 1 is replaced by a disc 16' in FIG. 2 between the bottom of the can 18' and the lower end of wound capacitor section 10'. Inflatable device 32' in FIG. 2 is made of any suitable insulating material that does not react when exposed to the filling liquid and which is capable of expanding when inflated. Device 32' takes the form of tubing 32a' that is sealed at its lower end and wrapped around the cylindrical wound capacitor section 10'. The upper end portion 32b' of the tubing is solid. For example, its bore is filled and sealed with rubber-like material that is non-reactive with the impregnating liquid. Portion 32b' fits tightly in metal tube 30' and it is sealed thereto in any suitable manner. As in the embodiment of FIG. 1, the capacitor is assembled in the form illustrated in FIG. 2 except for impregnation and final adjustment. A fine-bore needle is driven through the end portion 32b' of device 32' to reach the hollow passage of portion 32a'. The whole unit is then subjected to vacuum treatment and insulating liquid is admitted to the enclosure via a suitable opening, impregnating capacitor section 10' and filling the remaining space in the enclosure 18', 20', and at the same time the air in the bore of tubing 32' is drawn out and the impregnating liquid fills tubing 32. Additional impregnating liquid as required is forced into the tubing until the desired capacitance at terminals 24' is attained. The pressure inflates and expands device 32' somewhat and the pressure bears against the wound capacitor section and increases its capacitance. The filling needle is withdrawn, and the needle passage closes behind the needle. The adjusted capacitor is in readiness for use. For further providing assurance against escape of liquid from portion 32a', the metal tube 30' can have one or more annular crimps 30b' formed therein.

Figure 3:
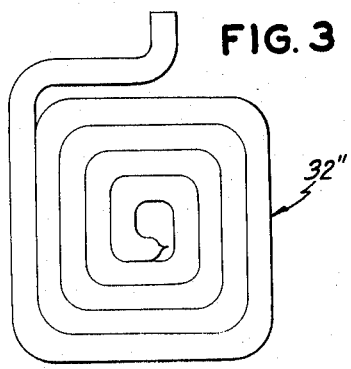
FIG. 3 is a modified form of inflatable member shaped as positioned in the unit.

It is sometimes impractical to make capacitor sections of cylindrical cross section and instead it is customary in some classes of capacitors (particularly the larger sizes) to flatten the wound sections before assembly into enclosing cans. When this is done, it will be found advantageous to form the inflatable adjusting device 32" as shown in FIG. 3, one end of which is closed off and the other end formed for filling as described in connection with FIGS. 1 and 2. Such a device can be used either within the flattened capacitor section 100 (FIG. 4) or between the outside surface of the flattened capacitor section 100' and the wall of the can 118, 118', as illustrated in FIGS. 4 and 5, respectively.

Figure 4:
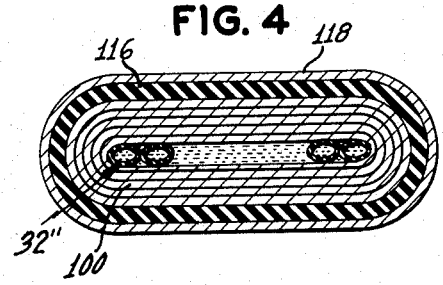
FIGS. 4 and 5 are transverse cross sections of two additional modifications of the invention utilizing the inflatable member of FIG. 3.
Figure 5:
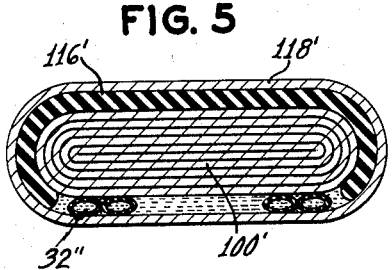

In FIGS. 4 and 5 elements 116 and 116' of insulation (like insulator 16 in FIG. 1) separate the capacitor section from the wall of the can. Naturally, where a stack of capacitor sections 100 or 100' are assembled in a common can, inflatable adjusting devices 32" can be interposed between successive flattened capacitor sections.

In each instance above, the capacitor includes a capacitor section in a can that is filled and impregnated, forming one fluid-pressure zone that is sealed from the exterior and there is a second zone of fluid pressure within the adjusting device that is sealed both from the exterior and from the space in the can occupied by the impregnated capacitor section and fluid-filled space. In each instance, further, the adjustment is carried out after the capacitor is otherwise completed so as to achieve the desired adjusted value of capacitance accurately after all other manufacturing operations that could introduce variables have previously been carried out.

It is known that the capacitance of a given unit of conventional impregnated and encased construction (without regard to the foregoing provisions for adjustment) may tend to drift or change in value gradually over a period of time, presumably due to some limited amount of creep of the electrodes and dielectric layers in relation to each other, due to internal stresses present in the wound section. Such drift in value of capacitance may be of little or no concern where the required capacitance value is specified with a broad permissible latitude of variation. However, such creep or drift may be found objectionable where high precision is required in the value of capacitance specified. For this reason, after the novel capacitor has been completed in all respects as described above but prior to adjustment, it is advisable to set aside or store such capacitors for a period of time sufficient to allow the capacitance drift to end. Thereafter the adjustment operation is carried out, in confidence that the adjusted value of capacitance will remain stable.

The form of adjustment described above and shown in the accompanying drawings may be contrasted with arrangements proposed heretofore for adjusting encased and impregnated capacitors, involving screws extending through a wall of the enclosure. Such arrangements involve a number of disadvantages, including the following. First, such arrangements require complicated and unreliable structures for sealing off the internal liquid filling against leakage past the screw to the exterior of the enclosure. Secondly, such adjustments involve a largely controlled distribution of mechanically applied pressure against different parts of the capacitor section. This tends to produce an excessive concentration of force at local portions within the capacitor section, a condition that promotes electrical breakdown.

The foregoing illustrative embodiments of the invention and its various aspects are readily susceptible of the wide range of modifications by those skilled in the art and therefore the invention should be construed broadly in accordance with its full spirit and scope.

I claim:

1. A method of manufacturing capacitors whose values of capacitance are maintained within a narrow latitude of the variation from a stated capacitance, which includes the steps of depositing a wound capacitor section in an enclosure together with an inflatable device arranged to apply pressure to said wound capacitor section transverse to the convolutions thereof, evacuating and then impregnating the capacitor section and the space within the enclosure with a dielectric fluid, forcing fluid into said inflatable device while measuring the capacitance of the capacitor section, and sealing the inflated device to retain its pressure filling.

2. An electrical capacitor including an enclosure, a capacitor section in said enclosure having multiple layers comprising conductive metallic electrodes mutually separated by interposed dielectric layers, and means for maintaining the capacitance of said capacitor section at an established value including an elastic-walled device filled with fluid under pressure for maintaining pressure against said capacitor section transverse to said layers thereof, said inflatable device having a closed filling port that is at least initially accessible externally of said enclosure.

3. An electrical capacitor, including an enclosure, a wound capacitor section of dielectric strips interposed between and mutually separating a pair of metallic electrodes, and a fluid-filled pressurized device confronting said dielectric strips for applying lateral pressure thereto, said capacitor section and said device being contained in said enclosure and being maintained by the enclosure in pressure-contact with each other for maintaining the capacitance of the capacitor at a value established by the pressure-contact as aforesaid.

4. An electrical capacitor, including a wound capacitor section comprising multiple dielectric layers interposed between multiple metallic electrodes, a capacitance adjuster comprising an inflatable portion and a filling closure portion, and an enclosure containing said capacitor section and said inflatable portion of said capacitance adjuster, said inflatable portion confronting said dielectric layers for applying pressure thereto, said filling closure portion extending from said inflatable portion within the enclosure through a wall of the enclosure.

5. An electrical capacitor in accordance with claim 4, wherein the inflatable portion of said capacitance adjuster is tubular and is received in an axial winding-mandrel passage of the wound capacitor section.

6. An electrical capacitor in accordance with claim 4, wherein said capacitor section is generally cylindrical and wherein said inflatable portion of the capacitance adjuster is a tube having a sealed end and is spirally wrapped about the capacitor section.

7. An electrical capacitor in accordance with claim 4, wherein said capacitor section has opposite relatively wide side faces and wherein said section includes a central space extending from end to end of the section and being relatively wide parallel to said side faces and being relatively narrow transverse to said side faces, and wherein said inflatable portion is received in and substantially fills said central space.

8. An electrical capacitor in accordance with claim 4, wherein said capacitor section has opposite relatively wide faces and wherein said inflatable portion of said capacitance adjuster is generally coextensive with and in pressure-applying relation to one of said side faces.

9. An electrical capacitor in accordance with claim 4, wherein said capacitor section and said enclosure have relatively wide generally flat confronting surfaces that are separated from each other by a narrow space and wherein said inflatable portion of the capacitance adjuster contains fluid under pressure and is confined between said confronting surfaces.

10. An electrical capacitor in accordance with claim 4, wherein said capacitance adjuster, said enclosure and said capacitor section contain dielectric liquid of the same composition.

11. A method of manufacturing capacitors whose values of capacitance are to be fixed at a specified value within a narrow latitude of variation, which includes the steps of enclosing a capacitor section in a container, the capacitor section being of a form having multiple electrodes separated by successive layers of dielectric material, assembling an inflatable member against said capacitor section and arranged to apply pressure transverse to the electrodes and the separating layers of dielectric material and with the inflatable member accessible externally of the container so as to represent a first liquid-pressure zone in the container that is separate from the remainder of the space in the container constituting a second liquid-pressure zone, filling both of said zones with the same insulating liquid and impregnating the capacitor section therewith, and adjusting the pressure of the liquid in the inflatable device while measuring the capacitance, and sealing off the inflatable member for maintaining the particular fluid pressure therein when the desired capacitance has been attained.

12. A capacitor including a capacitor section comprising a number of layers of dielectric material and electrodes separated by the layers of dielectric material, a container enclosing said capacitor section, and inflatable pressure-applying device in lateral contact with said layers of dielectric material and electrodes, said inflatable device defining a first liquid-pressure zone in the container divided from another zone in the enclosure containing the capacitor section, and said first liquid-pressure zone having an externally accessible portion for pressure adjustment, said second zone being filled and the capacitor section therein being impregnated with an insulating liquid, and said inflatable device also being filled with the same insulating liquid at a critical pressure that establishes the desired adjustment of the capacitance value of said capacitor.

13. An electrical capacitor in accordance with claim 4, wherein said filling closure is a self-sealing element of resilient material penetrable by a tubular needle.

14. An electrical capacitor in accordance with claim 13, wherein said inflatable portion is filled with fluid under pressure for maintaining an initially established capacitance of the capacitor section.

15. A method of manufacturing capacitors whose values of capacitance are maintained within a narrow latitude of the variation from a stated capacitance, which includes the steps of depositing a wound capacitor section in an enclosure together with an inflatable device arranged to apply pressure to said wound capacitor section transverse to the convolutions thereof, the inflatable device having a self-sealing closure of resilient material accessible externally of the enclosure, evacuating and then impregnating the capacitor section and the space within the enclosure with a dielectric fluid, forcing a tubular needle through the closure and forcing fluid via said needle into said inflatable device while measuring the capacitance of the capacitor section, and withdrawing said tubular needle.

References Cited by the Examiner

UNITED STATES PATENTS

| | | | |
|---|---|---|---|
| 2,983,856 | 5/1961 | Martin | 317—260 X |
| 3,018,427 | 1/1962 | Marbury | 317—260 X |
| 3,125,710 | 3/1964 | Kaplan | 317—260 X |

FOREIGN PATENTS 381,494           Great Britain.

ROBERT K. SCHAEFER, *Primary Examiner.*

JOHN F. BURNS, *Examiner.*

E. GOLDBERG, *Assistant Examiner.*